July 23, 1963 H. P. KEIL 3,098,650
OPERATING CONTROL MECHANISM FOR DUPLICATING MACHINES
Filed April 8, 1960 11 Sheets-Sheet 2

Fig. 2

INVENTOR.
HENRY P. KEIL
BY
*Greek Wells*
ATTY.

July 23, 1963

H. P. KEIL 3,098,650

OPERATING CONTROL MECHANISM FOR DUPLICATING MACHINES

Filed April 8, 1960

INVENTOR.
HENRY P. KEIL
BY
*Frank Wells*
ATTY.

July 23, 1963 H. P. KEIL 3,098,650
OPERATING CONTROL MECHANISM FOR DUPLICATING MACHINES
Filed April 8, 1960 11 Sheets-Sheet 5

Fig. 5

INVENTOR.
HENRY P. KEIL
BY
ATTY.

Fig. 6

July 23, 1963  H. P. KEIL  3,098,650
OPERATING CONTROL MECHANISM FOR DUPLICATING MACHINES
Filed April 8, 1960  11 Sheets-Sheet 7

INVENTOR.
HENRY P. KEIL
BY
ATTY.

July 23, 1963　　　　H. P. KEIL　　　　3,098,650
OPERATING CONTROL MECHANISM FOR DUPLICATING MACHINES
Filed April 8, 1960　　　　　　　　　　11 Sheets-Sheet 8

INVENTOR.
HENRY P. KEIL
BY
ATTY

July 23, 1963  H. P. KEIL  3,098,650
OPERATING CONTROL MECHANISM FOR DUPLICATING MACHINES
Filed April 8, 1960  11 Sheets-Sheet 9

INVENTOR.
HENRY P. KEIL
BY
ATTY.

July 23, 1963 H. P. KEIL 3,098,650
OPERATING CONTROL MECHANISM FOR DUPLICATING MACHINES
Filed April 8, 1960 11 Sheets-Sheet 10

INVENTOR.
HENRY P. KEIL
BY

ATTY.

Fig. 17

INVENTOR.
HENRY P. KEIL

United States Patent Office 3,098,650
Patented July 23, 1963

3,098,650
OPERATING CONTROL MECHANISM FOR
DUPLICATING MACHINES
Henry P. Keil, Chicago, Ill., assignor to Fixture Hardware Corporation, Chicago, Ill., a corporation of Illinois
Filed Apr. 8, 1960, Ser. No. 20,931
7 Claims. (Cl. 271—57)

My invention relates to a novel operating control mechanism for duplicating machines. It is designed for the automatic operation of electrical machines. The invention is shown as utilized in controlling a duplicating machine of the liquid process type. In machines of this type, the master sheet printed in reverse with hectographic ink is placed on a rotatable drum and the copy sheets are moistened with a solvent and pressed against the master sheet on the drum to thereby transfer the printed material from the master sheet to a copy sheet. The control system as disclosed is equally adaptable to other varieties of duplicating machines, such as mimeograph machines or gelatin process machines.

It is an object of this invention to provide a simple effective system for operating a duplicating machine wherein the copy sheets may be fed into the machine intermittently by hand or automatically from a stack.

It is another object of this invention to provide mechanical means to restrict intermittent operation to a single cycle without stopping the motor.

It is another object of this invention to provide a simple switch arrangement which will automatically stop the motor and machine after the stack of copy sheets has been fed into the machine.

It is still another object of the machine to provide a control system which will insure completion of a cycle to thereby always clear the machine of the printed copy sheets before terminating operation of the machine.

It is another object of the invention to provide a novel clutch and brake adapted to mechanically stop the printing mechanism in response to a plurality of electrical controls.

These and further objects will be apparent from a study of the following specification and drawings. The embodiment shown herein is exemplary, but is not intended to limit the scope of the invention, which is defined in the claims.

In order to fully grasp the significance of this invention, a complete understanding of the duplicating machine structure must be mastered. This is established in the following description of an exemplary machine, in this instance a liquid process type machine. The interrelation between the machine structure and the controls will be explained as each significant portion of the machine is described. A roller moistening apparatus is shown, however any of the usual moistening devices may be substituted in its place without deviating from the invention.

Referring now to the drawings, and to FIGURES 1-6 in particular, I have shown my invention as embodied in a duplicating machine comprising a pair of spaced apart side frames 20 and 21 tied together by a plurality of cross rods 22, 23, 24, 25, 26. The master sheet drum shaft 27 is journalled between the side frames 20—21, and carries thereon a master sheet drum 28. A copy sheet feed tray 29 is supported between the side frames 20 and 21 at one end of the machine, and the copy sheet receiving tray 30 is supported between the side frames 20 and 21 at the other end of the machine. A copy sheet feeder, generally indicated at 31 in the drawings, is provided above the feed tray 29 to feed copy sheets one at a time into printing engagement with the drum 28. As illustrated best in FIGURE 2, the copy sheets, shown at 32, are fed along an inclined ramp 29a of the feed tray 29, and into engagement with a pair of rollers 33 and 34. The roller 33 is a feed roller, and the roller 34 is a counter feed and moistening roller. The roller 33 is driven, by means hereinafter described, to advance the sheet 32 to the drum 28. A platen roller 35 is provided beneath the drum 28 and engaged therewith. The copy sheets 32 are fed by the roller 33 and the moistening roller 34 into the bight between the platen roller 35 and the drum 28. The drum 28, of course, has a master sheet wrapped therearound and secured thereto by a master sheet clamp 28a on the drum, and the copy sheet 32 is pressed into intimate contact with the master sheet as it is advanced between the drum 28 and the platen roller 35. The copy sheet 32 is propelled from the drum 28 into the receiving tray 30 after having left the drum 28 and having received indicia thereon from the master sheet.

As illustrated in the drawings, the feed roller 33 and the platen roller 35 are carried between spaced apart lever arms 36 which are pivoted to the side frames 20 and 21 by stub shafts 37. The lever arms 36 are pivotable about the stub shafts 37 so that the feed roller 33 and the platen roller 35 may be raised and lowered into and out of engagement with the moistening roller 34 and the drum 28 respectively. The mechanism for raising and lowering the feed roller 33 and the platen roller 35 is old and well known, and is described in detail in my prior Patent No. 2,856,847, issued October 21, 1958. Basically the raising and lowering mechanism for the lever arms 36 comprises stop members 38 on the arms 36 which engage trip levers 39 fixed to a shaft 40 which extends between the side frames 20 and 21. By rotating the shaft 40 to move the trip levers 39 from the position shown in FIGURE 2 upwardly, they may be disengaged from the stops 38 to permit the lever arms 36 to pivot downwardly and lower the feed roller 33 and platen roller 35. The mechanism for rotating the shaft 40 comprises an operating handle 41 journalled on the tie rod 26 which is connected by a lever 42, a link 43, and a lever 44, to the shaft 40 in such a way that movement of the control handle 41 is transmitted through the levers 42 and 44 and the link 43 to the shaft 40 to pivot the trip levers 39. The trip levers 39 are held in either their horizontal position, or their upwardly pivoted position by an over center lock mechanism generally indicated at 45 in the drawings.

The clutch mechanism and its controls are shown in detail in FIGURES 10–14, while the assembly is shown in FIGURES 2 and 4–6. Driving power is supplied from an electric motor 46 supported on a rectangular plate 130 beneath the feed tray 29. Plate 130 is supported by a cross member 131 secured between side plates 20 and 21. Plate 130 extends beneath motor 46 which is connected to it by brackets 132, 137 and also extends beneath a transmission bracket member 49. The starting controls for the motor 46 include a starting coil 134 and a condenser 135, which are mounted on a cross plate 136 also secured to plate 130.

Motor 46 drives a worm 48 which is journalled in bracket member 49 supported between side frames 20, 21 on the tie rods 22 and 23 and also bolted at 138 to plate 130. Bracket member 49 comprises a lower section 140, two sides perpendicular to worm 48 and designated as 141, 142 and a third triangular bearing support 143. A drive gear 50 is mounted above worm 48 in driving engagement therewith and is fixed on a shaft 51 journalled between side frame 20 and bearing support 143. Shaft 51 drives a clutch generally designated as 47.

Clutch 47 is a one way clutch composed of an outer race 144 fixed to rotate in unison with shaft 51 and an inner race 145 which is joined by pins 146 to a belt pulley 52. Both inner race 145 and pulley 52 are rotatably journalled on shaft 51. Inner race 145 has cut into it a plurality of peripheral notches 147. Each notch 147 contains a roller 148 and a compression spring 150. A ring 151 is rotatably mounted on the inner race 145 and has a plurality of pins 152 attached to it, which extend into each of the notches 147 between roller 148 and the peripheral edge of the notch. The clutch 47 normally operates as a usual one-way clutch, and transmits rotation from shaft 51 to pulley 52 when shaft 51 is rotated in the direction shown by arrow 153 in FIGURE 13. As long as pins 152 are allowed to freely rotate, they do not hinder the operation of the clutch. If the ring 151, and thereby pins 152, are braked, the rollers 148 are held in the deep ends of notches 147 by engagement against pins 152. This brakes the inner race 145 and the pulley 52, while at the same time allowing free rotation of the shaft 51 and outer race 144.

Figure 10:
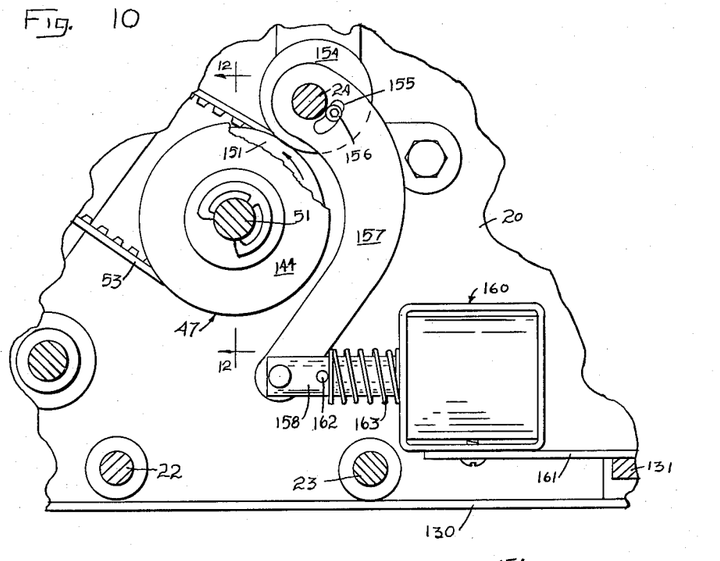
FIGURE 10 is a fragmentary sectional view taken along line 10—10 in FIGURE 5 showing the braking mechanism.
Figure 11:
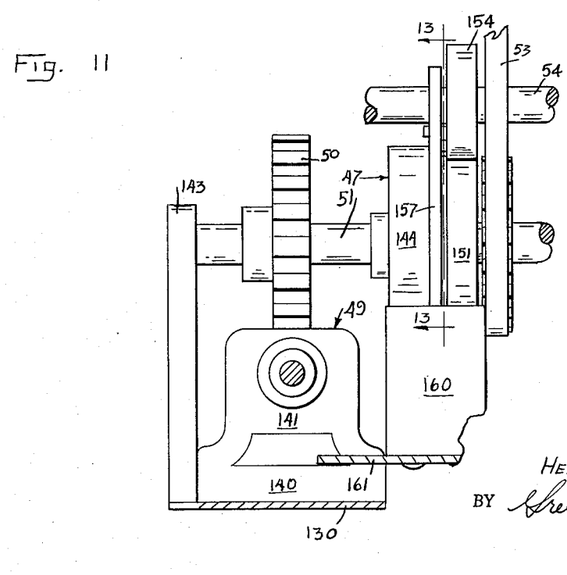
FIGURE 11 is a fragmentary side view of the clutch and brake mechanism taken from the right hand side of FIGURE 10.
Figure 12:
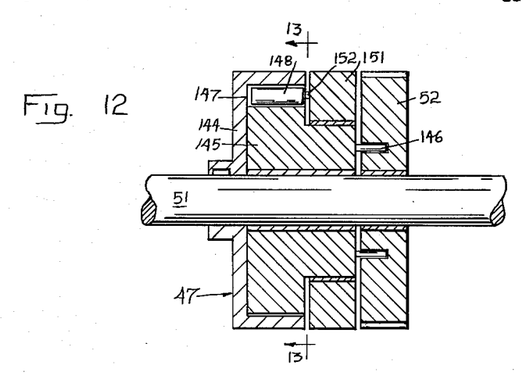
FIGURE 12 is a sectional view taken along line 12—12 in FIGURE 10.
Figure 13:
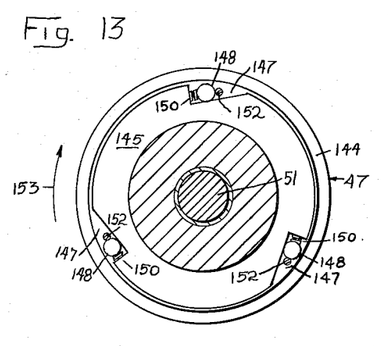
FIGURE 13 is a sectional view of the clutch taken along line 13—13 in FIGURE 11.
Figure 14:
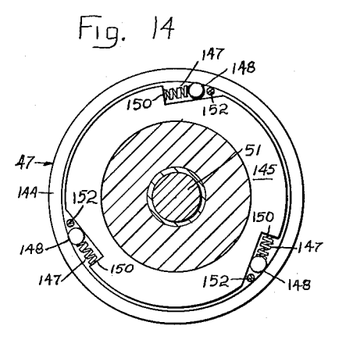
FIGURE 14 is a sectional view identical in position to that shown in FIGURE 13 showing the clutch when the brake is activated.

The manner in which ring 151 is braked is best seen in FIGURE 10. A cam 154 is rotatably mounted on shaft 24 in direct adjacent alignment with the outer periphery of ring 151. The cam 154 has attached to it by means of slot 155 and bolt 156, a curved lever 157 which extends around the outer surface of clutch 47. Lever 157 is also pivoted about shaft 24, so as to have a common pivot point with cam 154. The cam 154 is arranged so as to increase in radius as lever 157 is pivoted downward, thereby frictionally engaging the outer periphery of ring 151.

Pivotally attached to the lower end of lever 157 is a horizontal shaft 158 of a solenoid 160 which is fixed by means of mounting bracket 161 to the cross member 131.

A pin 162 is fixed through shaft 158 and serves as an abutment for a compression spring 163 which also abuts the housing of solenoid 160 and which surrounds shaft 158 as shown. The spring normally urges cam 154 against ring 151 to brake the ring 151 and thereby cause clutch 47 to freewheel as described. Energization of solenoid 160 results in the release of ring 151 by cam 154 to thereby allow normal driving operation of clutch 47.

Figure 3:
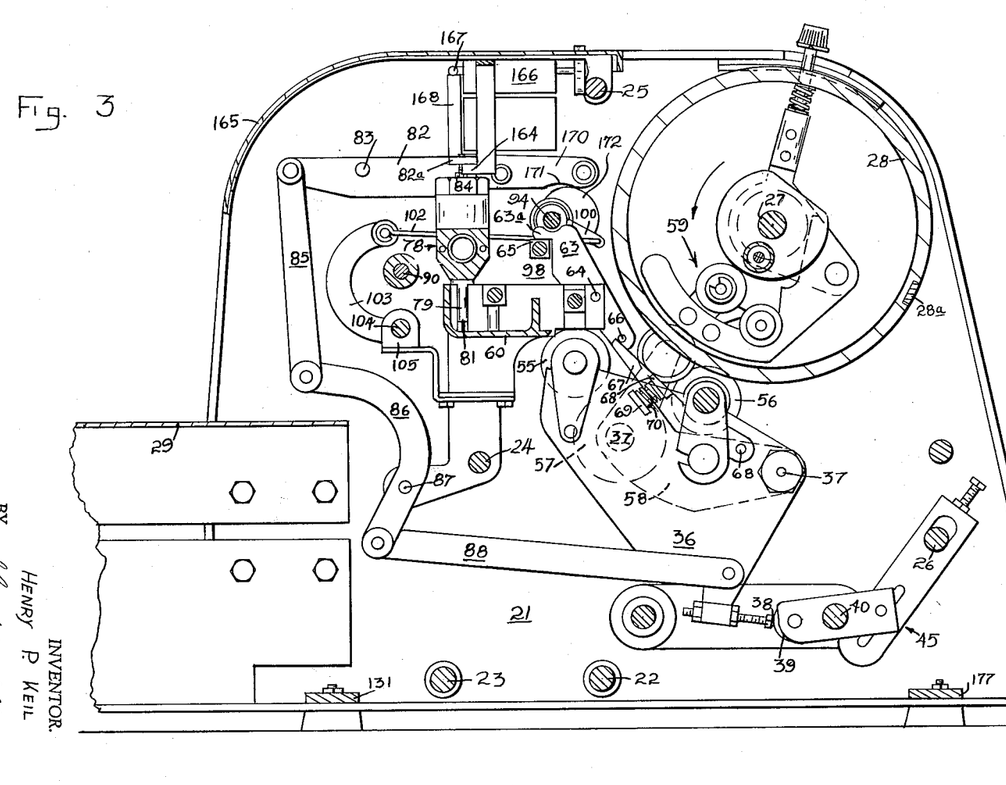
FIGURE 3 is a fragmentary sectional view taken along line 3—3 in FIGURE 1.
Figure 4:
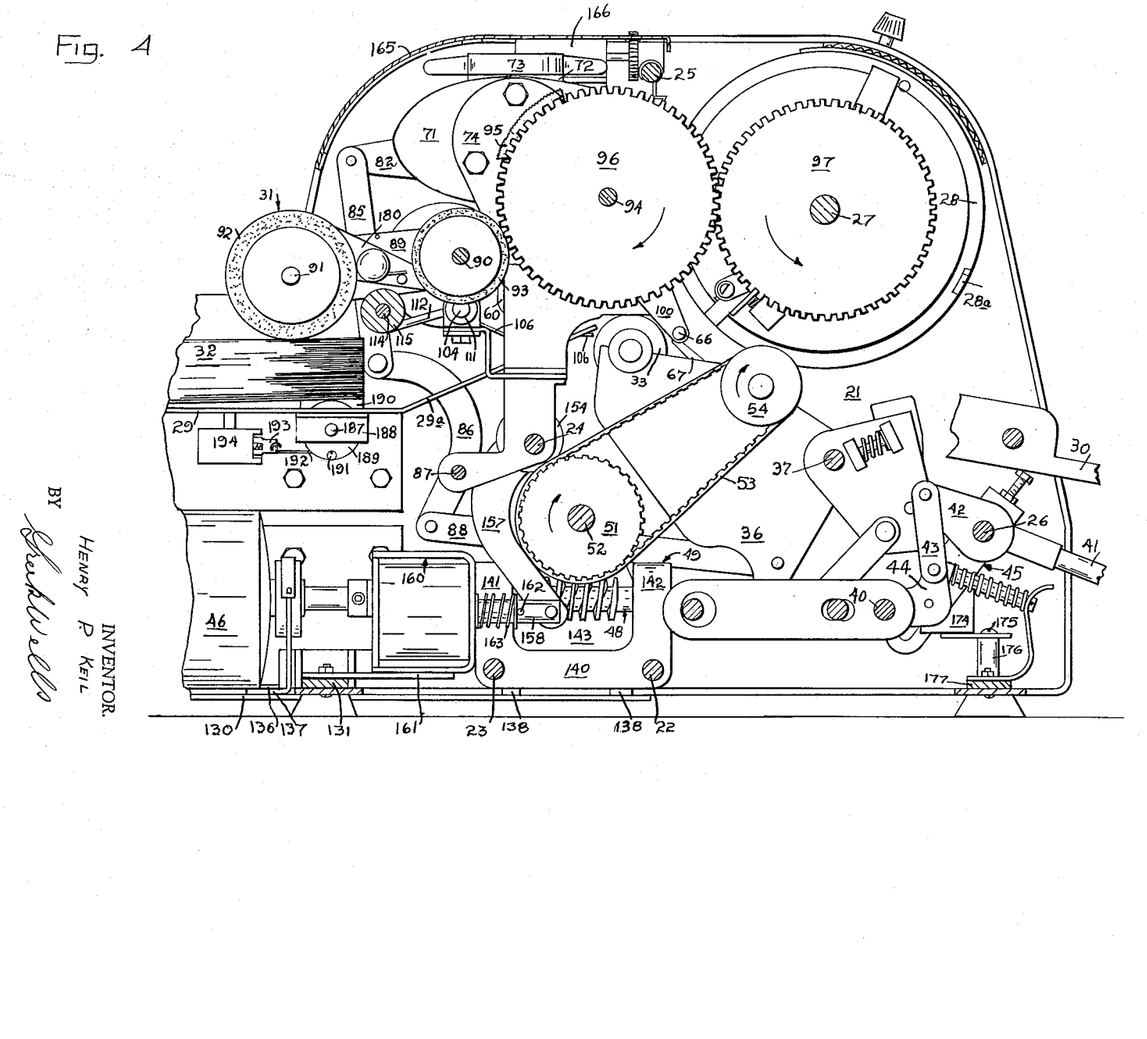
FIGURE 4 is a fragmentary sectional view taken along line 4—4 in FIGURE 1 with the side plate and side guide left out.
Figure 5:
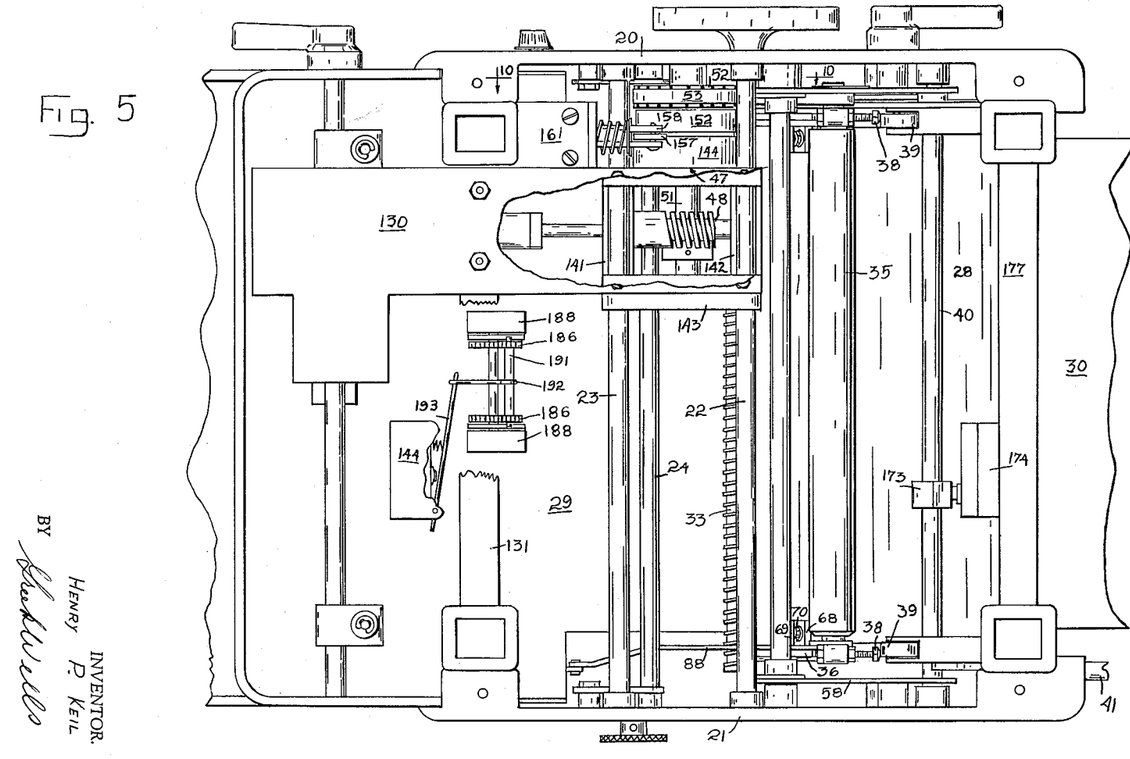
FIGURE 5 is a fragmentary bottom view of the machine shown in FIGURE 1.
Figure 6:
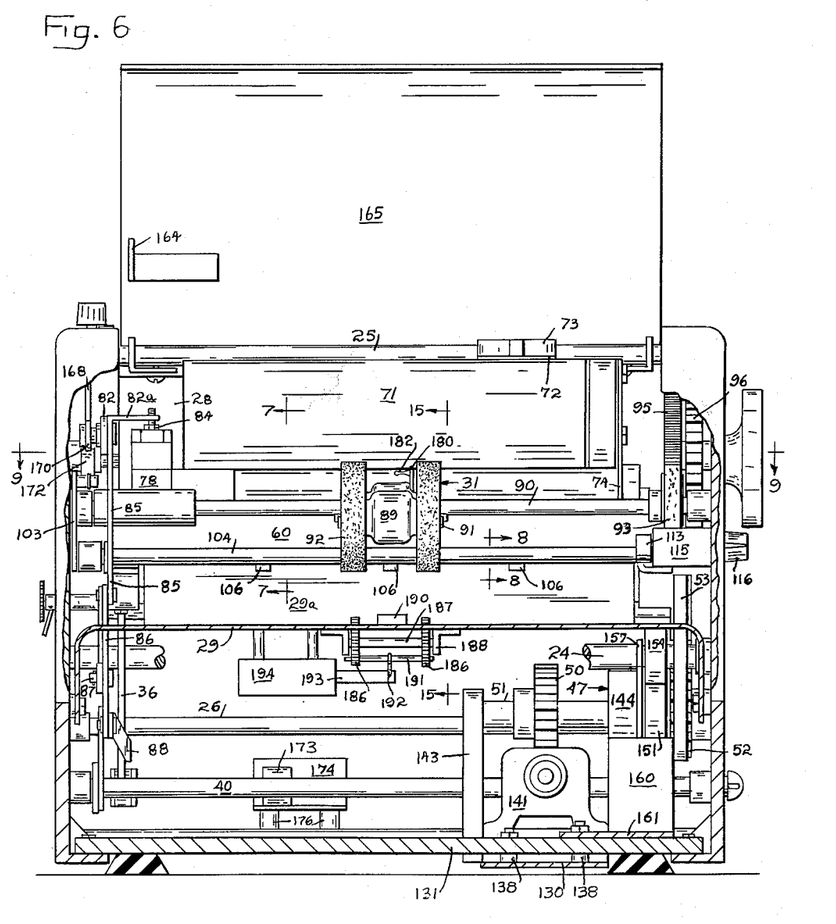
FIGURE 6 is a sectional view taken along line 6—6 in FIGURE 2, with the cover opened and a portion of the side walls being broken away.

As hereinbefore described, the copy sheets 32 are advanced into the bight between the platen roller 35 and the drum 28 by the feed roller 33. The feed roller 33 is driven intermittently during each revolution of the drum 28. The means for driving the feed roller 33 are shown in dashed lines in FIGURE 3 of the drawings. As illustrated in FIGURE 3, the platen roller 35 and the feed roller 33 have knurled wheels 56 and 55 fixed at their ends between the side frame 21 and the adjacent lever arm 36. A rubber idler roller 57 is positioned between the knurled wheels 55 and 56, and is journalled on a frame 58 which is pivoted to the stub shaft 37 of the lever arm 36. The frame 58 is movable up and down to move the idler roller 57 into and out of engagement with the knurled wheels 55 and 56. When the framework 58 is pivoted upwardly to bring the roller 57 into engagement with the wheels 55 and 56, power is transmitted from the wheel 55 on the platen roller 35 through the idler roller 57 and to the knurled wheel 56 to drive the feed roller 33. The driving control mechanism, indicated generally by the numeral 59 is provided at the end of the drum 28 adjacent the side frame 21 and is operable to raise and lower the frame 58 to move the idler roller 57 into and out of engagement with the knurled wheels 55 and 56 during each revolution of the drum 28. This control mechanism 59 includes means to change the timing of the rotation of the roller 33 with respect to the rotation of the drum 28 when desired, to control placement of the indicia on the copy sheets 32 with respect to their leading edges and thus adjust the margin on the copy sheets 32. The mechanism 59 is not described in detail herein for it is identical to that disclosed in detail in my prior Patent No. 2,813,483, issued on November 19, 1957, for Margin Control Mechanism for Duplicating Machines.

Duplicating machines of the character described herein depend upon a liquid of a well known type to cause a transfer of the indicia on the master sheet to the copy sheet. The faces of the copy sheets to be imprinted are coated with liquid before they are brought into engagement with the master sheet. In the duplicating machine described herein, the liquid is spread upon one face of each copy sheet 32 by means of the moistening roller 34. As illustrated in the drawings, the moistening roller 34 is supplied with liquid from a fountain 60 supported between the side frames 20 and 21. As illustrated in the drawings, the fountain roller 61 is journalled in the fountain in communication with the liquid therein. A liquid transfer roller 62 is provided between the fountain rollers 61 and moistening roller 34 and in engagement with each. As the moistening roller 34 is driven by frictional engagement with the roller 33, it drives the transfer roller 62 and the fountain roller 61. Liquid is carried by the fountain roller 61 and the transfer roller 62 to the surface of the moistening roller 34, and from the surface of the moistening roller 34 onto the copy sheet 32 as it passes between the roller 34 and the feed roller 33.

In order for the transfer roller 62 to transfer liquid from the fountain roller 61 to the moisture roller 34 in the proper amounts, a certain amount of downward pressure must be exerted upon it. This pressure is supplied by means of transfer roller pressure arms 63 which are pivoted on pins 64 secured to the fountain 60 as best shown in FIGURE 3. The pressure arms 63 have portions 63a which overlie the ends of the transfer roller 62, and which engage bearing members 65 journalled on the ends of the transfer rollers 62. The pressure arms 63 have at their lower ends horizontal pins 66 which are engaged by lever arms 67 pivoted on pins 68 mounted on the lever arms 36 which carry the feed roller 33 and platen roller 35. The levers 67 have blocks 68 fixed thereon, and similar blocks 69 are fixed to the lever arms 36 adjacent to the levers 67. Springs 70 are interposed between the blocks 68 and 69 and urge the arms 67 upwardly against the pins 66 on the pressure arms 63. This force is communicated through the pressure arms 63 as a downward force on the transfer roller 62. When the lever arms 36 are pivoted downwardly by actuation of the trip levers 39 to lower the platen roller 35 and the feed roller 33 away from the drum 28 and moistening roller 34 respectively, the arm 67 is also lowered away from the pressure arm 63 whereby to remove the downward pressure from the transfer roller 62 to prevent it and the rollers 61 and 34 from developing a flat spot or imperfections in their surfaces when the machine is left idle.

The fountain 60 is supplied with liquid from a container 71 which is mounted thereover between the side frames 20 and 21. The container 71 has a filling opening 72 in the top thereof which is closed by an air and liquid tight closure 73. The container 71 is supported at its end adjacent to the side frame 20 upon a depending foot member 74 which rests upon a pedestal member 75 supported at the adjacent end of the fountain 60. The foot 74 has a slot 76 therein which receives a pin 77 that projects upwardly from the pedestal 75 to maintain the container 71 in proper position. At the opposite end of the container 71 a valve unit 78 is provided. The valve unit 78 includes a downwardly extending outlet 79 which is received in a well 80 formed in the adjacent end of the fountain 60. A valve actuating stem 81 projects downwardly through the bottom of the outlet 79 and rests in the bottom of the well 80. The stem 81 is connected to a valve within the unit 78 in such a way that when it is moved upwardly with respect to the outlet 79 it opens the valve that permits the flow from the container 71 through the outlet 79. The stem 81 is spring pressed downwardly to project below the lower end of the outlet 79 and to maintain the valve closed. The construction of the valve unit 78 and the connection of the stem 81 thereto is not shown in detail herein since it is identical to the valve mechanism disclosed in my prior Patent No. 2,856,847, issued on October 21, 1959, for a Liquid Process Duplicating Machine. Suffice it to say that the valve may be opened to permit liquid to flow from the container 71 through the outlet 79 and into the fountain 60 by forcing the valve unit 78 downwardly to bring the bottom end of the outlet 79 into engagement with the bottom of the well 80, thereby moving the stem 81 upwardly with respect to the valve unit 70. The valve may be closed by removing the downward pressure against the valve unit 78 whereby to permit the stem 81 to be spring pressed downwardly to close the valve.

The mechanism for applying downward force on the valve unit 78 to open the valve and allow liquid to flow into the fountain 60 is shown best in FIGURE 3. As shown in this figure, a horizontal lever 82 is pivoted to the side frame 21 on the stub shaft 83. The lever 82 has an offset portion 82a at its rearward end which carries a valve unit engaging head 84 which is adapted to engage with and exert a downward pressure upon the valve unit 78. The opposite end of the lever 82 is pivoted to a vertical link 85 which in turn is pivoted to a crank 86 pivoted intermediate its ends on a stub shaft 87 supported on the side frame 21. The lower end of the crank 86 is pivotally connected to a rearwardly extending link 88 that is connected to the feed roller and platen roller supporting lever 36 adjacent the side frame 21. It will be understood from examination of FIGURE 3 that when the lever arm 36 is pivoted about its stub shaft 37 to bring the platen roller 35 and the feed roller 33 into engagement with the drum 28 and the moistening roller 34 respectively, the link 88 pivots the crank 86 about its pivot point 87 to cause the link 85 to be moved upwardly. This upward movement of the link 85 pivots the lever 82 about its pivot point 83 to exert the necessary downward force on the valve unit 78 to open the valve therein and permit liquid flow from the container 71 to the fountain 60. When the feed roller and platen roller supporting lever arm 36 is pivoted downwardly to lower the feed roller 33 and the platen roller 35, the link 88 pivots the crank 86 in the opposite direction to lower the link 85 and pivot the lever 82 upwardly to remove the force from the valve unit 78 whereby to permit the valve to be closed. With this construction liquid is supplied to the fountain 60 at all times when the platen roller 35 and the feed roller 33 are in operative position but is not supplied to the fountain 60 when the feed roller 33 and platen roller 35 are lowered to inoperative position. Portion 82a of lever 82 engages an ear 164 on hinged cover 165 to hold cover 165 down during operation. When handle 41 is raised, portion 82a releases cover 165.

As described later herein, the copy sheets 32 stacked on the feed tray 29 are fed into the bight between the feed roller 33 and the moistening roller 34 by the copy sheet feeder 31. As shown best in FIGURES 15 and 16 the feeder 31 comprises a housing unit 89 pivoted at one end to a shaft 90 which is journalled between the side frames 20 and 21 in front of the fountain 60. The housing 89 extends forwardly from the shaft 90 and carries at its forward end a cross shaft 91 which has two sheet feeding rubber wheels 92 fixed thereon. Within the housing 89 drive means described in Patent No. 2,856,847, cited above, are provided to rotate the shaft 91 in response to rotation of the shaft 90. Thus, by driving the shaft 90, the copy sheet feeding wheels 92 can be driven to slide the top copy sheet 32 from the stack on the feed tray 29 into the bight between the feed roller 33 and the moistening roller 34. The cross shaft 90 has a drive roller 93 fixed thereon near its end adjacent the side frame 20. The cross shaft 94 journalled between the side frames 20 and 21 behind the shaft 90 carries a quadrantal drive segment 95 thereon which is aligned to engage and drive the roller 93 for a short period during each revolution of the shaft 94. The shaft 94 is drivingly connected to the drum shaft 27 by cooperating gears 96 and 97 fixed to the shaft 94 and the drum shaft 27 respectively adjacent the side frame 20. The gears 96 and 97 rotate the cross shaft 94 once for each rotation of the drum 28. Segment 95 is so positioned on the shaft 94 that it will drive the roller 93, and consequently the feeder 31, at the proper time to advance a copy sheet to the bight between the rollers 33 and 34 just before the feed roller 33 is driven. As soon as the segment 95 moves past the drive wheel 93, all driving engagement is removed and the shaft 90 and the feeder wheels 92 are free to rotate as the copy sheet is advanced by the rollers 33 and 34.

Figure 7:
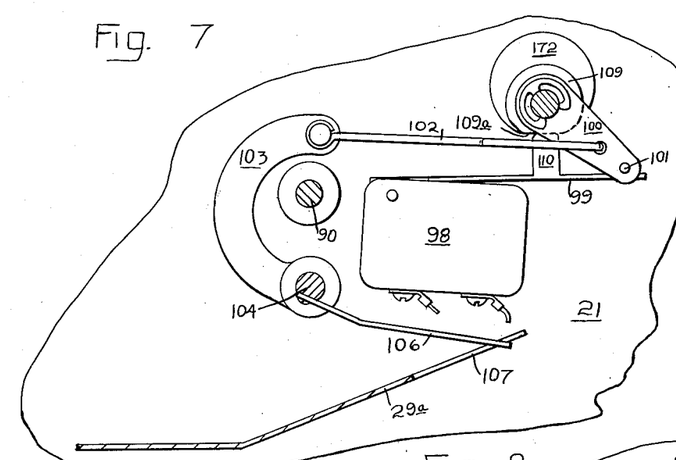
FIGURE 7 is a fragmentary sectional view taken along line 7—7 in FIGURE 6 showing the left hand portion of the intermittent feed control mechanism with the remainder of the machine being deleted.
Figure 8:
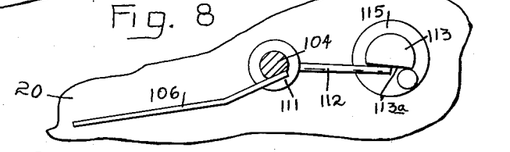
FIGURE 8 is a fragmentary sectional view taken substantially along line 8—8 in FIGURE 6 showing the right hand portion of the intermittent feed control mechanism.
Figure 9:
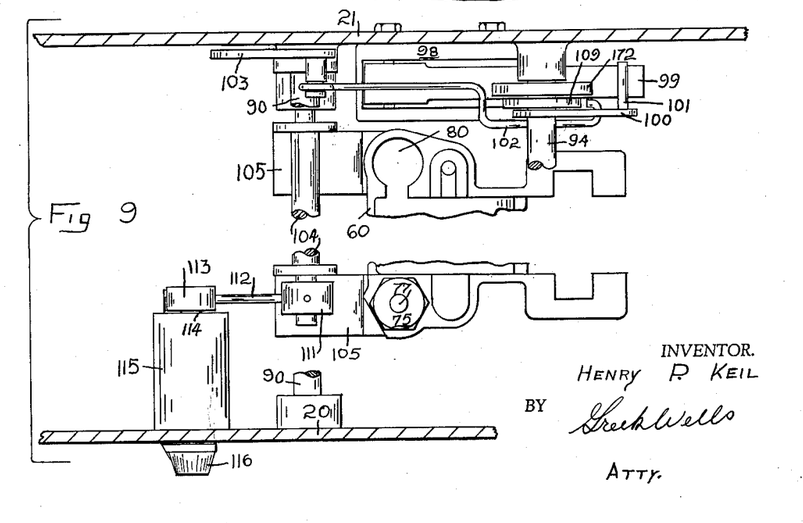
FIGURE 9 is a fragmentary sectional view of the intermittent control mechanism taken substantially along line 9—9 in FIGURE 6, with the central portion being broken away.

My improved feeding machine includes the unique intermittent operation control which permits copy sheets 32 to be fed through the machine singly and which stops the machine after each cycle pending the insertion of a new copy sheet into the bight between the rollers 33 and 34. As best illustrated in FIGURES 7, 8, 9, an electric switch 98 is fixed to the side frame 21 of the machine between the adjacent end of the fountain 60 and the side frame 21. The switch 98 controls current flow to the solenoid 160 which controls clutch 47 interposed between the driving motor 46 and the pulley 52. When the switch 98 is closed, solenoid 160 pulls cam 154 away from ring 151 which allows clutch 47 to lock and rotation of the drive shaft of the motor 46 is thereby transmitted to the pulley 52. When the switch 98 is opened, solenoid 160 is deenergized and cam 154 is moved by the spring 163 and lever 157 against the ring 151 to lock clutch 47 in a freewheeling position, and the pulley 52 is not driven even though the motor 46 is energized. When the switch 98 is held in closed position, the machine will operate continuously and perform its duplicating function so long as sheets 32 remain on the tray 29. If the switch 98 is opened at the end of each cycle, however, the machine will stop at the end of each cycle and remain idle until the switch is closed.

The switch 98 is operated by an actuating arm 99 which is spring pressed upwardly to normally open position. A lever 100 is pivoted to the cross shaft 94 for free pivotal movement thereon above the arm 99. The lever 100 has a pin 101 at its free end which is adapted to engage with and depress the switch arm 99 to close the switch 98. The lever 100 is connected by a link 102 to an upstanding lever 103 which is fixed to a shaft 104 provided in front of the fountain 60. As shown in FIGURE 9 the shaft 104 is journalled in brackets 105 fixed to the fountain 60. The shaft 104 has fixed thereon a plurality of rearwardly projecting fingers 106 which are adapted to pivot down into slots 107 provided in the inclined lip 29a of the feed tray 29 to form obstructions to the advancement of copy sheets 32 over the lip 29a. The fingers 106 are so positioned with respect to the lever 103 on the shaft 104 that when they are raised to permit insertion of a copy sheet 32 into the bight between the rollers 33 and 34, the lever 103 is pivoted counterclockwise as viewed in FIGURE 7 to cause the link 102 to swing the lever 100 down to close the switch 98. Thus, when a copy sheet 32 is pushed manually against the fingers 106, they are caused to raise and the switch 98 is closed to start a cycle. The weight of fingers 106 pivots the shaft 104 to its initial position after each copy sheet has passed.

Since the cycle is only partially completed when the copy sheet leaves the lip 29a on its journey through the machine, it is necessary to provide means to hold the switch 98 closed until the cycle has been completed, even though the fingers 106 have dropped into the slots 107 and the lever 100 has been raised away from the switch actuating arm 99. This is accomplished by providing on the cross shaft 94, a cam 109, and by providing on the switch arm 99 a cam follower 110. As shown in FIGURE 7, the cam 109 is shaped to depress the follower 110 to close the switch 98 during the major part of each revolution of the shaft 94, but has a flat reduced diameter portion 109a thereon which permits the switch 98 to be opened. This portion 109a is located on the cam 109 in such a position that the switch 98 is opened only at the completion of a cycle and when the machine is ready to receive a new copy sheet 32. When a cycle is commenced by raising the fingers 106, and the machine is set in motion, the cam 109 is commenced to rotate, and the switch 98 is held closed until the cycle is complete regardless of the positioning of the lever 100. Thus it will be seen that with this construction movement of the lever 100 by the fingers 106 is necessary to start a cycle, but once the cycle is started, the machine will not stop until it is completed. When the fingers 106 are allowed to drop into the slots 107, the machine is set for manual feeding and intermittent operation.

It is, of course, necessary to provide means for locking the fingers 106 in upraised position and for thus maintaining the switch 98 constantly closed to set the machine for automatic feeding, for in many cases manual feeding is not desired. To accomplish this, I provide on the shaft 104 at the end thereof adjacent the side frame 20, a collar 111 which has a forwardly extending pin 112 thereon. The collar 111 is fixed on the shaft 104 so that by pivoting the pin 112 downwardly, the shaft 104 may be rotated in a direction to raise the fingers 106 free of the lip 29a and to cause the lever 103 to swing the lever 100 down to close the switch 98. The pin 112 is engaged with a cam 113 fixed on a shaft 114 that is journalled in a spacer 115 secured to the side frame 20. The shaft 114 extends through the side frame 20, and has a turning knob 116 secured thereto outside the side frame 20. Manual adjustment of the knob 116 results in rotation of the cam 113. As shown in FIGURE 8 the operating face cam 113 is substantially circular in shape, but has a flat spot 113a therein. When the knob 116 is turned to bring the flat spot 113a into engagement with the pin 112, the fingers 106 are free to drop into the slots 107 in the lip 29a and the machine is adjusted for intermittent operation. When the knob is rotated to move the flat spot 113a away from engagement with the pin 112, the pin 112 is cammed downwardly to raise the fingers 106 and close the switch 98 for automatic operation.

In order to count the number of sheets which have been printed, a counter 166 is provided on side plate 21. As seen in FIGURE 3, the operating arm 167 of counter 166 is adapted to be tripped by an arm 168 fixed to a lever 170 which is pivotally journalled on shaft 83. The rearward end of lever 170 has a curved lower configuration designated as 171, which rests on a cam 172 fixed to cross shaft 94. Cam 172 is shaped so as to lift lever 170 once during each revolution to thereby activate counter 166.

Figure 1:
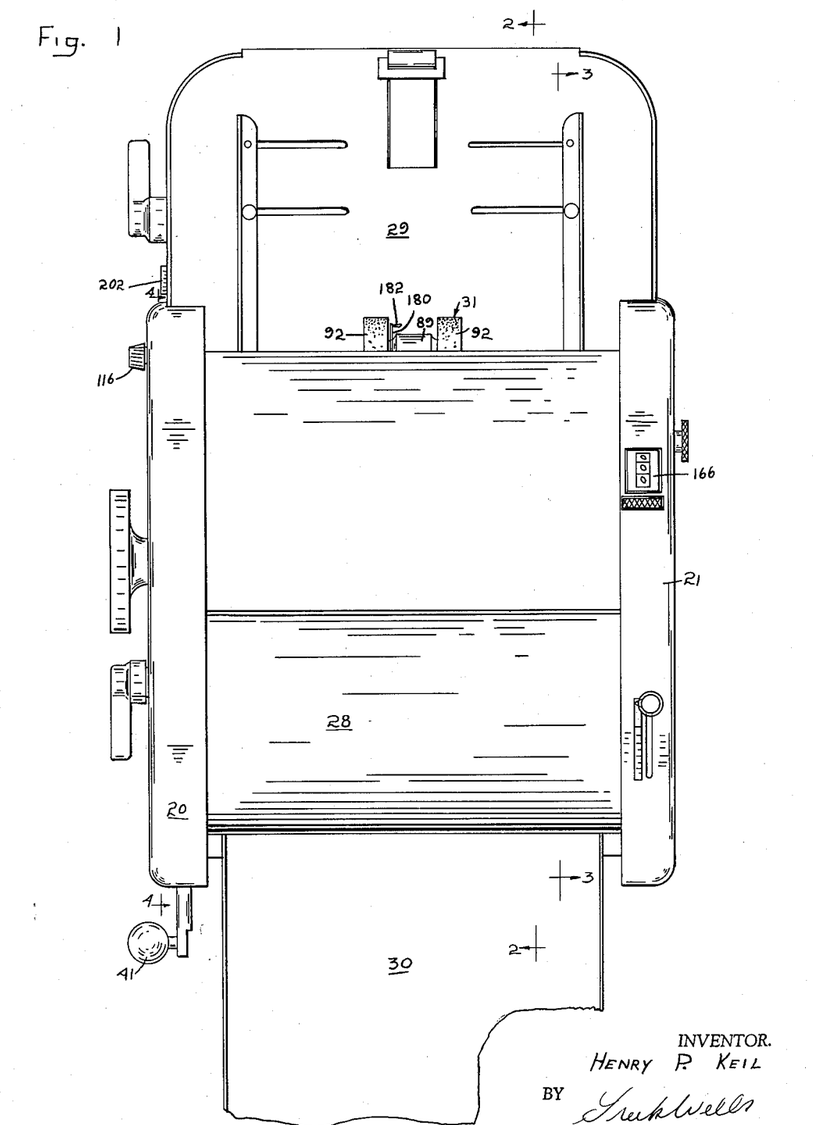
FIGURE 1 is a top plan view of a duplicating machine equipped with my invention.
Figure 2:
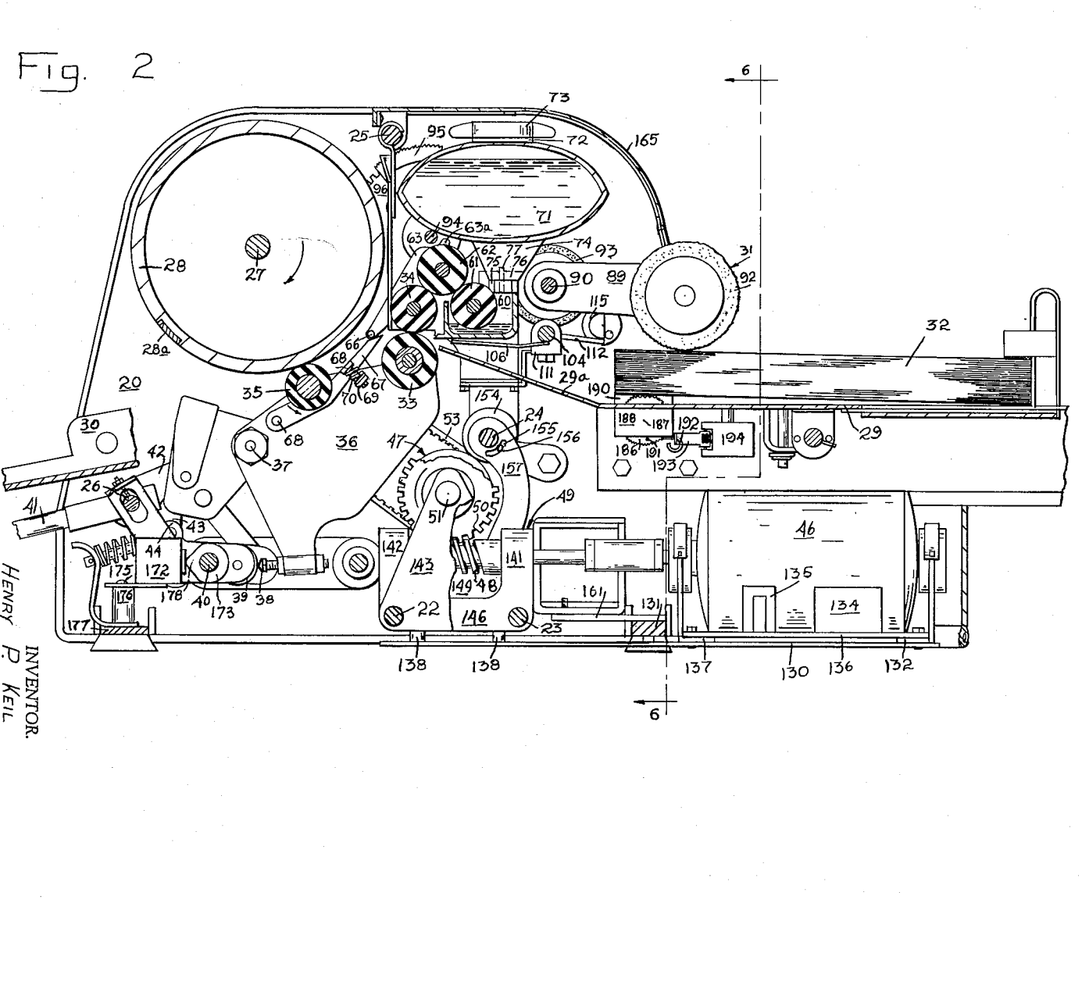
FIGURE 2 is a fragmentary sectional view taken along line 2—2 of FIGURE 1.

The main control for the machine is shown in FIGURE 2. It consists of a cam 173 which is fixed to shaft 40, which is pivoted by operating handle 41. Cam 173 is positioned adjacent a micro-switch 174 which is fixed by means of bolts 175 and spacers 176 to a cross bar 177 fixed between the side plates 20 and 21. Cam 173 has a generally circular face with a raised portion 178 adapted to operate the micro-switch 174. Portion 178 lies at rest above the button of switch 174 when handle 41 is in its upper position. When handle 41 is pivoted downwardly, shaft 40 is pivoted in a counter-clockwise direction as viewed in FIGURE 2, thereby bringing portion 178 into contact with the switch button which thereby activates micro-switch 174. Switch 174 controls the operation of motor 46 as will be described below.

Figure 15:
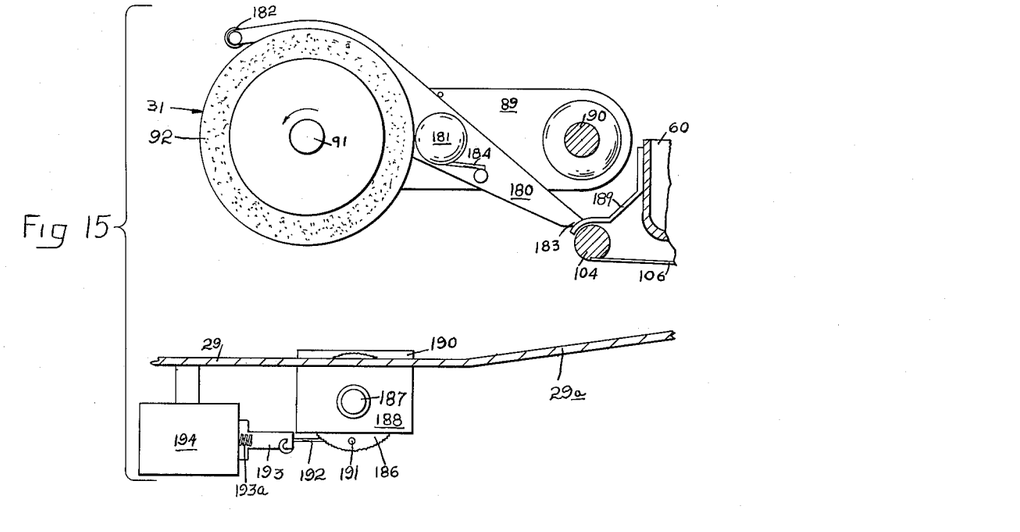
FIGURE 15 is a fragmentary sectional view taken substantially along line 15—15 in FIGURE 6, showing the feed control.
Figure 16:
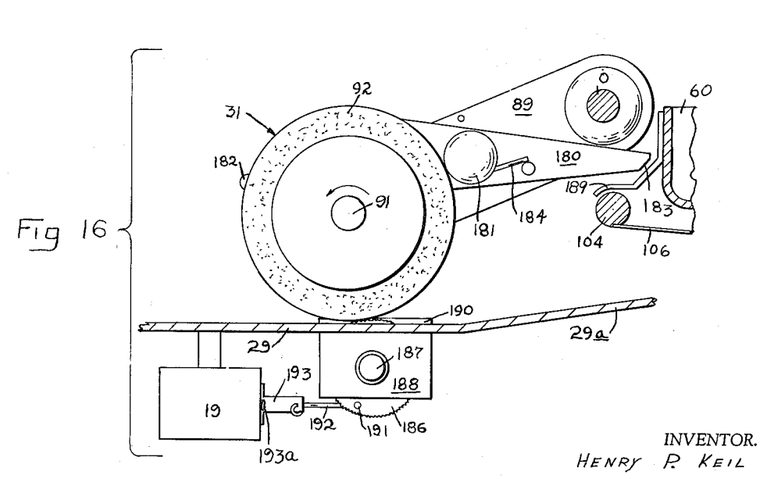
FIGURE 16 is a view similar to FIGURE 15 showing the feed mechanism at the end of a feeding operation.

A cut-off switch is provided so as to turn the machine off by opening the circuits to solenoid 160 and motor 46 when the last copy sheet has been fed from feed tray 29. As seen in FIGURES 15 and 16 the housing unit 89 of copy sheet feeder 31 has pivoted to it a locking lever 180 which is pivoted by a pin 181 fixed to unit 89. Lever 180 is provided with a handle 182 at one end and has a blunt configuration 183 at its remaining end. This blunt configuration 183 of lever 180 normally rests on a bracket 189 fixed to fountain 60 above shaft 104 to hold the copy sheet feeder 31 in an upper position. Spring 184 biases lever 180 into its lowest position to engage bracket 189. If handle 182 is moved downwardly to disengage lever 180 from bracket 189, the copy sheet feeder will pivot about shaft 90 to thereby drop rubber wheels 92 into engagement with the copy sheets 32.

The surface of feed tray 29 has two apertures through which serrated wheels 186 extend. Wheels 186 are each journalled on a shaft 187 which in turn is journalled in two ears 188 depending downwardly from feed tray 29. A rubber block 190 is fastened to feed tray 29 between the upper surfaces of wheels 186 and is formed of a height sufficient to allow copy sheets 32 to clear the serrated edges of the wheels 186.

The wheels 186 are positioned directly in the pivotal path of rubber wheels 92 on copy sheet feeder 31, so as to be engaged by the respective wheels 92 when the wheels 92 are at their lowest position with no copy sheets 32 between wheels 92 and serrated wheels 186.

A rod 191 is rotatably mounted on and extends between wheels 186 and is radially offset from shaft 187. The rod 191 therefore turns about shaft 187 in unison with turning of wheels 186. A link 192 is pivoted to the center of rod 191 and extends to an operating lever 193 of a normally closed micro-switch 194 which is mounted on the lower surface of copy sheet feed tray 29. Lever 193 is spring biased by spring 193a to rotate wheels 186 to their rest position illustrated in FIGURE 15 with switch 194 closed.

In order to open switch 194, the wheels 186 must be rotated a portion of a revolution. This is accomplished through the rubber wheels 92 which are rotated at the beginning of each feeding cycle. If the machine is operating automatically, the drop of feed mechanism 31 will bring the wheels 92 into contact with the serrated edges of wheels 186 after the final copy sheet 32 has been fed into the machine. At the start of the next feeding operation, the wheels 92 will be rotated a partial revolution, which will then cause wheels 186 to activate the micro-switch 194 and thereby open the circuits controlled by it.

Figure 17:
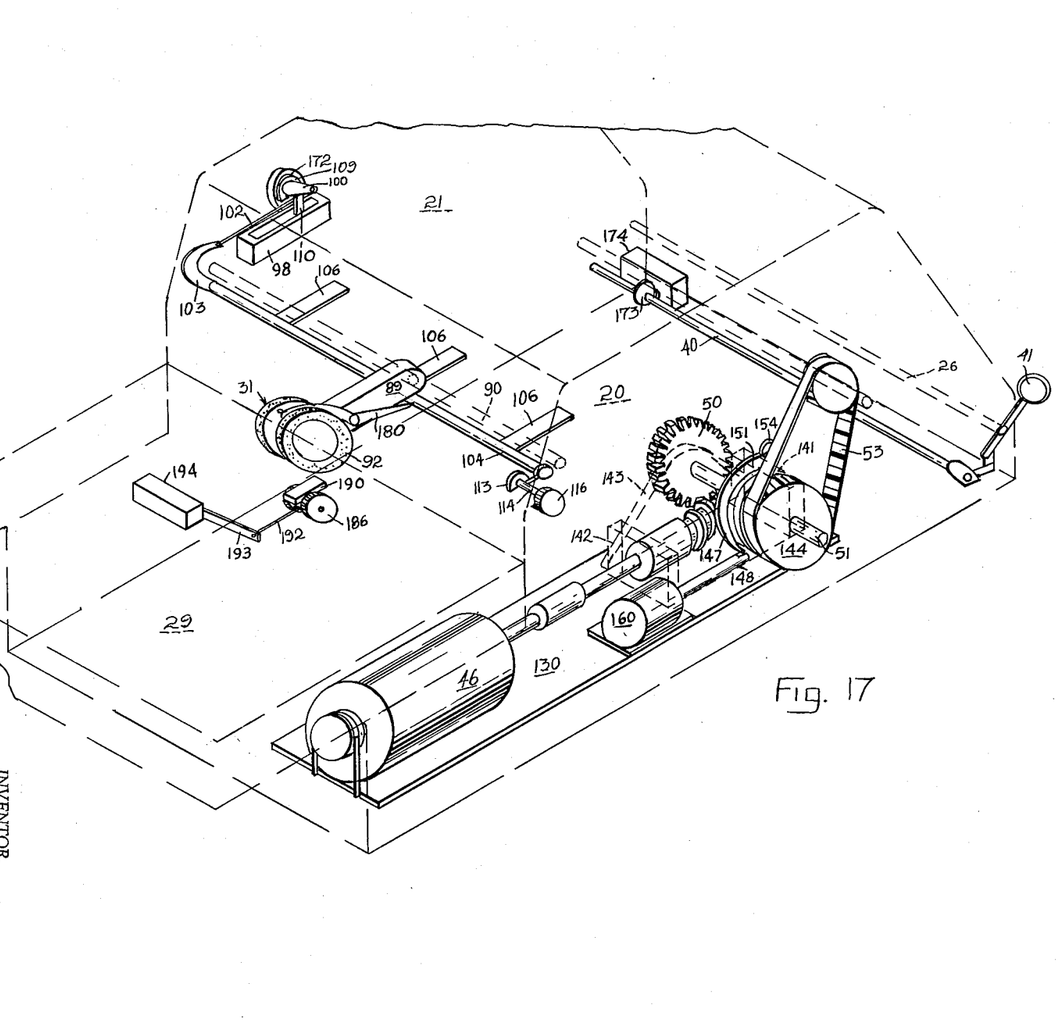
FIGURE 17 is a phantom perspective view of the entire control system with the machine structure shown in dashed lines.
Figure 18:
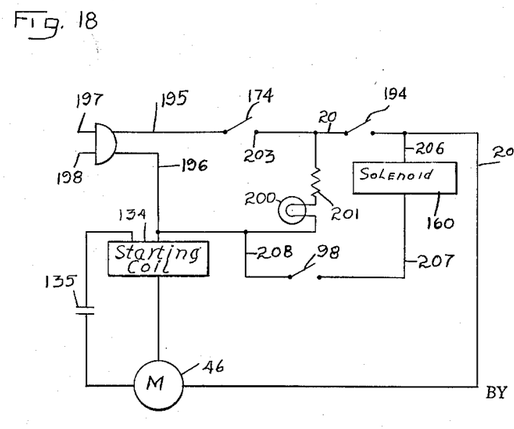
FIGURE 18 is a wiring diagram of the control system.

In order to acquire a complete grasp of the operation and interrelation of the control components, attention is directed to FIGURES 17 and 18. FIGURE 17 shows the control members in a single phantom view. FIGURE 18 shows the wiring connections, which have been omitted in all prior views in order to clarify the mechanical construction of the machine.

The main control of the machine is afforded by switch 174 which is actuated by moving handle 41 to its operating position. Switch 174 is connected to line 195, which, along with line 196, is connected to the electrical power supply at terminals 197, 198 respectively. Connected between the second terminal 203 of switch 174 and line 196, is a pilot lamp 200. Lamp 200 is wired in series with a resistor 201, since lamp 200 is of a low voltage type. Lamp 200 is positioned in a translucent housing 202 located in the forward side portion of the machine (see FIGURE 1).

Terminal 203 of switch 174 is also connected by means of line 204 to the first terminal of normally closed switch 194 which is activated by rollers 92 on copy sheet feed mechanism 31. The remaining terminal of switch 194 is connected to line 205 which is connected to a first terminal of motor 46. This remaining terminal of switch 194 is also wired by means of line 206 to a first terminal of solenoid 160, which controls clutch 47. The remaining terminal of solenoid 160 is connected by means of line 207 to switch 98, which is controlled by rotation of shaft 104, either manually or by a copy sheet 32. Switch 98 is in turn connected to line 196 by means of line 208. The motor 46 is provided with a starting coil 134 and a condenser 135 which are wired in a known circuit between line 196 and the remaining terminals of motor 46.

Normal operation of the machine is as follows. The handle 41 is lifted to turn the machine off by opening micro-switch 174. This results in all the control circuits being opened, regardless of the positions of the other switches. When handle 41 is shifted downwardly, switch 174 is closed. This completes the pilot lamp circuit to lamp 200, which is lighted continuously while handle 41 is in its lower position. Normally the feed mechanism 31 will be held in its elevated position by lever 180, so that switch 194 is in its normally closed position. This results in a completed motor circuit to activate motor 46. The initial position of switch 98 is its open position, which maintains the circuit to solenoid 160 in an open state. While solenoid 160 is at rest cam 154 brakes ring 151 to allow clutch 47 to freewheel. No motion is transmitted from motor 46 beyond the clutch 47.

If feeding is to be done manually, each copy sheet is fed individually so as to contact the fingers 106. This closes switch 98 and energizes solenoid 160 to thereby release cam 154 from engagement with ring 151. The clutch then is locked until switch 98 is again opened in the manner described above. Intermittent operation is therefore gained by use of clutch 47, using a continuously operating motor 46.

For automatic operation, a stack of copy sheets 32 is placed on the copy feed tray 29 and lever 180 is released so as to allow the feed mechanism 31 to drop the wheels 92 into contact with the top copy sheet 32. Knob 116 is then rotated to lock switch 98 in a closed position, thereby activating solenoid 160 and allowing clutch 47 to lock. Each copy sheet will then be processed in a continuous run. After the final copy sheet has been printed, wheels 92 will pivot the serrated wheels 186 and thereby open micro-switch 194. Switch 194 will open the circuits to both motor 46 and solenoid 160 to thereby deactivate the moving parts of the assembly. Lamp 200 will remain lighted however, as a visual indication that the machine's rollers are under pressure. When handle 41 is lifted to relieve this pressure, lamp 200 will be turned off.

Various modifications may be evident to one trained in this field, particularly when adapting these controls to a different model of a duplicating machine. Such mechanical considerations are not intended to limit the scope of this invention, which is aptly defined in the following claims.

Having thus described my invention, I claim:

1. In a duplicating machine having a feed tray, a rotatable wheel mounted on a lever pivoted to the frame of the machine and adapted to rest upon the copy sheets being fed into the machine, and drive means connected to the wheel adapted to periodically rotate the wheel, the improvement comprising a second wheel mounted on the feed tray in the pivotal path of the rotatable wheel and below the lower copy sheet, and switch means operatively connected to said second wheel adapted to be operated in response to rotation of said second wheel by the rotatable wheel when the two wheels are in engagement with one another.

2. In a duplicating machine having a feed tray, first wheel means rotatably mounted above the feed tray on a lever pivotally mounted on the frame of the machine, said first wheel means being adapted to rest upon the stack of copy sheets to be fed into the machine, and drive means connected to the first wheel means adapted to periodically rotate the first wheel means to thereby feed the uppermost of the copy sheets in the stack into the machine, the improvement comprising second wheel means rotatably mounted on the feed tray below the stack of copy sheets and lying exposed within the pivotal path of the first wheel means, said second wheel means being adapted to be rotated by said first wheel means when said first wheel means is in frictional contact therewith, and switch control means operatively connected to said second wheel means adapted to be operated in response to rotation of said second wheel means.

3. In a duplicating machine having a feed tray, a pair of resilient wheels rotatably mounted above the feed tray on a lever pivotally carried by the frame of the machine, said pair of resilient wheels being adapted to rest upon the stack of copy sheets to be fed into the machine, and drive means connected to said pair of resilient wheels adapted to periodically rotate them in unison to thereby feed into the machine the uppermost copy sheet in the stack, the improvement comprising a pair of serrated wheels rotatably mounted below the surface of the feed tray and projecting upwardly through slots in the feed tray, said serrated wheels being positioned in the respective pivotal paths of the resilient wheels to be engaged thereby after the last copy sheet has been fed into the machine, support means on the upper surface of the feed tray adapted to maintain the copy sheets out of contact with said serrated wheels, and control means operatively connected to said pair of serrated wheels adapted to be operated in response to rotation of said pair of serrated wheels by said pair of resilient wheels.

4. A device as defined in claim 3 wherein said control means comprises a rod joining said pair of serrated wheels at corresponding locations radially displaced from their centers, an electrical switch mounted on the lower surface of the feed tray and including a biased pivoted operating lever, and a link connecting said rod and said operating lever.

5. A device as defined in claim 4 wherein said electrical switch in normally closed and is connected in series with said drive means in an electrical circuit controlling the drive means.

6. In a duplicating machine having a feed tray, a first wheel movably mounted on the frame of the machine directly above said feed tray adapted to rest upon a stack of copy sheets being fed into the machine, and drive means operatively connected to the wheel adapted to rotate the wheel to thereby transfer the copy sheets individually from the stack, the improvement comprising a second wheel mounted on the feed tray in the path of movement of the first wheel and below the stack of copy sheets, and control means operatively connected to said second wheel and to said drive means adapted to be actuated responsive to rotation of said second wheel by contact with said first wheel.

7. In a duplicating machine having a feed tray, a first wheel, means movably mounting said first wheel so to allow motion of said wheel relative to the feed tray as the first wheel rests upon a stack of copy sheets, and drive means connected to the first wheel adapted to rotate the first wheel to thereby separate the top copy sheet from the stack, the improvement comprising a second wheel rotatably mounted on the feed tray about an axis parallel to the axis of said first wheel and positioned below the copy sheets in an exposed location lying in the path of said first wheel, said second wheel being adapted to be rotated by said first wheel when said wheels are in frictional contact with one another, and switch control means operatively connected to said second wheel adapted to be actuated by rotation of said second wheel.

References Cited in the file of this patent

UNITED STATES PATENTS

| | | |
|---|---|---|
| 225,974 | Ecaubert | Mar. 30, 1880 |
| 584,073 | Dexter | June 8, 1897 |
| 2,670,954 | Bach | Mar. 2, 1954 |
| 2,934,009 | Bach et al. | Apr. 26, 1960 |